Oct. 10, 1933.　　　O. RICHTER　　　1,930,395
TRACK MEASURING DEVICE FOR RAILROAD VEHICLES
Filed Aug. 12, 1932
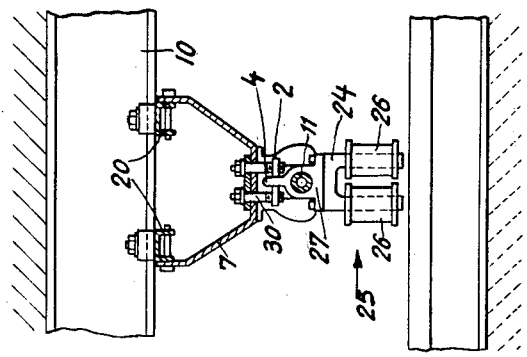
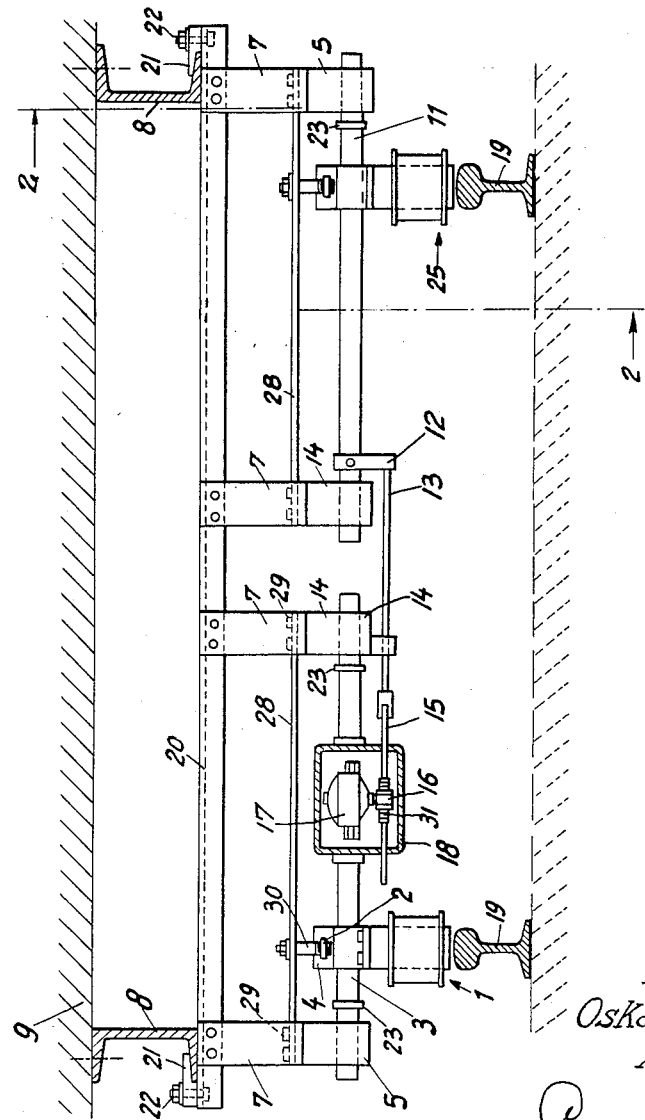
Inventor:
Oskar Richter
Attorney:

Patented Oct. 10, 1933

1,930,395

UNITED STATES PATENT OFFICE 1,930,395

TRACK MEASURING DEVICE FOR RAILROAD VEHICLES

Oskar Richter, Kiel-Neumuhlen, Germany

Application August 12, 1932, Serial No. 628,568, and in Germany August 12, 1931

4 Claims. (Cl. 33—144)

My invention relates to track measuring apparatus and more particularly to a device adapted to be mounted on a railroad vehicle and to measure and automatically indicate and/or record the distance between the rails of the track, as the vehicle travels along the same.

One object of my invention is to provide a device of this character which is of simple construction and reliable in operation. Another object is the provision of measuring means which do not depend in operation on mechanical contact with the rails but are controlled from the same by magnetic forces so as to eliminate mechanical friction. A further object of my invention is to provide for electric remote control of the recording and/or indicating means from magnetic elements which are directly responsive to the track.

I attain these and other objects which will appear hereinafter by arranging magnets, preferably electro-magnets, on the test car so as to be movable transversely to the direction of travel and to permit them to align themselves with the rails owing to the magnetic attraction. In order to facilitate the reading of the position of the electro-magnets, I prefer to mechanically connect the electro-magnets with an electric transmitter adapted to govern an indicating or recording device mounted in the test car at a suitable place by electric remote control. Owing to the magnetic attraction exerted by the rail on the coordinated electro-magnet, the latter will automatically align itself with the head of the rail without contacting with the same and any change of the relative location of the electro-magnets will be transmitted to and indicated and/or recorded by the registering device arranged in the car.

Accordingly, my invention consists in the features of construction, combination of elements and arrangement of parts which will be described by way of example with reference to the accompanying drawing in which Fig. 1 is a cross-section of the chassis of the vehicle and of the track showing my novel measuring equipment in elevation, and Fig. 2 is the section taken along lines 2—2 of Fig. 1.

At 9 I have diagrammatically indicated the structure of the chassis which carries the bearings of the axles (not shown) and will thus travel at an invariable distance from the rails 19 of the track. My novel measuring equipment is mounted on two beams 8 which extend longitudinally of the car and are suitably attached to the chassis 9. Two channel beams 20 extend in spaced parallel relation between the beams 8 and are clamped to the lower side thereof by means of clamps 21 held in place by bolts 22. The beams 20 are connected to each other by four brackets 7 arranged in spaced relation as shown in Fig. 1. From each of the two outer brackets 7 depends a bearing 5 while each of the two inner brackets carries a similar bearing 14 in alignment with the respective bearing 5.

One of the pairs of bearings 5, 14 accommodates a rod 3 which is preferably made hollow to reduce its weight, while the other pair of bearings 5, 14 carries similarly a hollow rod 11. Both rods are mounted in their bearings for easy longitudinal movement and are formed with collars 23 to limit the same. An electromagnet 1, or 25 respectively, is clamped to each of these rods in depending position, so as to overlie the associated rail 19 at a short distance without contacting with the same, as shown in the drawing.

Preferably, the electro-magnet has a U-shaped core 24 which carries coils 26 on its free ends and is suitably attached to a bracket 27 from which it depends. The bracket 27 has a boring through which the rod 3, or 11 respectively, extends and has an upwardly extending flange 4. The bracket 27 is firmly seated on its supporting rod so as to move in unison therewith.

In order to prevent the electro-magnets and their supporting rods from turning in the bearings 5, 14 I have provided special guiding means which comprise two bars 28 each extending from an outer bracket to an inner bracket 7 and being suitably attached thereto by bolts 29. Each bar 28 carries a pair of depending studs 30, the lower ends of which embrace flange 4 in any position thereof and carry anti-friction rollers 2 engaging the flange 4 to prevent it from rocking about the axis of the supporting rod 3 or 11 respectively. In this manner, the electro-magnets are kept in vertical position, but are practically free, except for a minimum amount of friction in the bearings 5, 14, to move transversely to the rails.

Suitable flexible electric cables not shown are attached to the structure in order to supply the electro-magnets with current.

Rigidly attached to rod or tube 3 is a casing 18 containing a suitable transmitter, for instance in form of a synchronous generator having a vertical rotor 17 carrying a pinion 16. Slidingly mounted in the walls of casing 18 there is a bar 15 formed between its ends as a rack 31 arranged in mesh with the pinion 16.

A member 12 is firmly attached to rod or tube 11 and is suitably connected with a rod 13 which is attached to bar 15. In this manner relative displacements of the electro-magnets 1 and 25 cause the bar 15 to be longitudinally displaced in the casing 18 and to impart a corresponding turn to pinion 16. Electrically connected to the synchronous generator in casing 18 is a synchronous motor (not shown) positioned at a suitable place in the test car and arranged to control suitable indicating and/or recording instrumentalities. As the electrical transmitting devices do not form part of my invention and are well-known, a detailed description thereof is deemed dispensable herewith. For more detailed information reference may be had to the German Patents No. 268,986 and 458,548. For the purposes of my present invention it is sufficient to know that any turn imparted to rotor 17 will be automatically repeated by the rotor of the registering device arranged within the test car.

In operation, the magnetic pull exerted by the rails 19 on the electro-magnets 1 and 25 will always tend to keep the same in aligned position symmetrically to the rails regardless of lateral displacements of the chassis relative to the track. Therefore, a lateral oscillation of the test car will not affect the accuracy of the measurement. A change in the distance of the rails, however, will cause the electro-magnets 1 and 25 to move towards to or away from one another and a corresponding turn of the rotor 17 will result which is transmitted to the indicating or recording instrument.

As my experiments have shown, it is essential for a proper operation of the device that the friction of the rods or tubes 3 and 11 in their bearings to be as small as possible and that the electro-magnets be energized by a powerful direct current.

My invention is in no way limited to the specific details shown and described but is capable of numerous modifications within the scope of the claims following hereinafter.

What I claim is:—

1. In a track measuring apparatus, a support adapted to be mounted on a vehicle and a magnet mounted on said support to overlie a rail of the track at a short distance therefrom and to be freely movable transversely of the track so as to be positioned in alignment with said rail by magnetic attraction.

2. A device for measuring the distance between the rails of railroad tracks which comprises a support adapted to be mounted on a vehicle, two magnets arranged on said support for free movement transversely of the track each above one of the rails, and means responsive to changes of the distance between said magnets and adapted to control a registering device.

3. A device for measuring the distance between the rails of railroad tracks which comprises a support adapted to be mounted on a vehicle, two magnets arranged on said support for free movement transversely of the track each above one of the rails, and an electric transmitter responsive to changes of the distance between said magnets and adapted to control a registering device.

4. A device for measuring the distance between the rails of railroad tracks which comprises a support adapted to be mounted on a vehicle, two magnets arranged on said support for free movement transversely of the track each above one of the rails, and an electric transmitter responsive to changes of the distance between said magnets and adapted to control a registering device, said transmitter comprising a casing rigidly connected to one of said magnets, a rotor in said casing, a member adapted to turn said rotor and mechanically connected with the other one of said magnets.

OSKAR RICHTER.